(12) United States Patent
Bostick et al.

(10) Patent No.: US 9,372,924 B2
(45) Date of Patent: Jun. 21, 2016

(54) ONTOLOGY DRIVEN DICTIONARY GENERATION AND AMBIGUITY RESOLUTION FOR NATURAL LANGUAGE PROCESSING

(75) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 13/494,726

(22) Filed: Jun. 12, 2012

(65) Prior Publication Data

US 2013/0332145 A1   Dec. 12, 2013

(51) Int. Cl.
*G06F 17/30* (2006.01)
*G06F 17/27* (2006.01)

(52) U.S. Cl.
CPC ...... *G06F 17/30731* (2013.01); *G06F 17/2785* (2013.01)

(58) Field of Classification Search
CPC ... G06F 17/27; G06F 17/2735; G06F 17/274; G06F 17/30734; G06F 17/2785
USPC .................. 704/1, 9, 10; 706/47, 55
See application file for complete search history.

(56) References Cited

U.S. PATENT DOCUMENTS

| | | | | |
|---|---|---|---|---|
| 4,862,408 | A | * | 8/1989 | Zamora ................. G06F 17/274 |
| 5,060,155 | A | * | 10/1991 | van Zuijlen ....................... 704/9 |
| 5,181,163 | A | | 1/1993 | Nakajima et al. |
| 5,794,050 | A | | 8/1998 | Dahlgren et al. |
| 6,085,187 | A | * | 7/2000 | Carter ............... G06F 17/30398 |
| 6,405,162 | B1 | * | 6/2002 | Segond et al. ..................... 704/9 |
| 7,899,666 | B2 | * | 3/2011 | Varone .............................. 704/9 |
| 7,991,760 | B2 | * | 8/2011 | Kolz et al. ..................... 707/708 |
| 8,370,130 | B2 | * | 2/2013 | Yun et al. .......................... 704/9 |
| 8,442,814 | B2 | * | 5/2013 | Ceusters et al. .................. 704/9 |

(Continued)

FOREIGN PATENT DOCUMENTS

CN          101216819 A       7/2008
WO       2011051970 A2       5/2011

OTHER PUBLICATIONS

Hyponymy and Hypernymy, Wikipedia, 6 Pages, downloaded Oct. 30, 2014.*

(Continued)

*Primary Examiner* — Martin Lerner
(74) *Attorney, Agent, or Firm* — Weitzman Law Offices, LLC

(57) ABSTRACT

A computer implemented method and system for natural language processing ambiguity resolution includes storing an ontology specifying a set of grammatical rules. A phrase comprising at least one current word to be processed is retrieved. A current word from the phrase is annotated with possible ontological classes according to the ontology. Any ontological rules associated with the possible ontological classes are retrieved. Ontological classes are eliminated based on the ontological rules. A surviving possible ontological class is determined to be an accurate ontological class for the current word. In another aspect of this disclosure, an ontology is stored in computer memory, the ontology having multiple ontological classifications, and word instances, each word instance associated with at least one of the ontological classifications. All word instances belonging to the selected ontological classification are retrieved.

6 Claims, 6 Drawing Sheets

(56) References Cited

U.S. PATENT DOCUMENTS

| | | | | |
|---|---|---|---|---|
| 8,463,593 | B2* | 6/2013 | Pell et al. | 704/9 |
| 8,504,359 | B2* | 8/2013 | Yun et al. | 704/231 |
| 2002/0059289 | A1* | 5/2002 | Wenegrat | G06F 17/30734 |
| 2005/0049852 | A1* | 3/2005 | Chao | 704/9 |
| 2005/0149510 | A1* | 7/2005 | Shafrir | G06F 17/30734 |
| 2005/0234709 | A1* | 10/2005 | Klavans | G06F 17/2735 704/10 |
| 2006/0053175 | A1* | 3/2006 | Gardner | G06F 17/30734 |
| 2007/0010994 | A1* | 1/2007 | Mueller | 704/9 |
| 2007/0118357 | A1* | 5/2007 | Kasravi et al. | 704/10 |
| 2007/0143285 | A1* | 6/2007 | Drumm et al. | 707/5 |
| 2008/0109212 | A1* | 5/2008 | Witbrock | G06F 17/2785 704/9 |
| 2008/0255826 | A1* | 10/2008 | Hio | G06F 3/018 704/10 |
| 2010/0082331 | A1* | 4/2010 | Brun et al. | 704/9 |
| 2010/0217764 | A1* | 8/2010 | Labrou | G06F 17/30731 707/738 |
| 2010/0299288 | A1* | 11/2010 | Gruber | 706/12 |
| 2012/0284259 | A1* | 11/2012 | Jehuda | G06F 17/30734 707/722 |
| 2015/0106079 | A1* | 4/2015 | Bostick | G06F 17/2775 704/9 |
| 2015/0142419 | A1* | 5/2015 | Edwards | G06F 17/2785 704/9 |
| 2015/0378984 | A1* | 12/2015 | Ateya | G06F 17/2755 707/769 |

OTHER PUBLICATIONS

B.A. Galler et al., Syntactic Techniques in Information Retrieval, IP.com No. IPCOM000128818D (Sep. 19, 2005).

H. Nomiyama et al., Two-Pass Lexical Ambiguity Resolution, IBM Technical Disclosure Bulletin, vol. 34, No. 7A (IP.com No. IPCOM000122407D) (Dec. 1991).

M. Temizsoy et al., An Ontology-Based Approach to Parsing Turkish Sentences (1998).

English language Abstract for CN 101216819 (cited above in this IDS).

* cited by examiner

200

Can I have these? — 205

FIG. 2A

205 — These — 210
annotation 1: pro-noun — 215
annotation 2: adjective

FIG. 2B

205 — These — 210
annotation 1: pro-noun — 215
~~annotation 2: adjective~~

FIG. 2C

ONTOLOGY DRIVEN DICTIONARY GENERATION AND AMBIGUITY RESOLUTION FOR NATURAL LANGUAGE PROCESSING

BACKGROUND

1. Field

This disclosure relates generally to data processing of linguistic data, and, more particularly, to ontology-driven natural language processing.

2. Background

Natural language processing utilizes software to analyze and understand human languages. Understanding a human language requires knowing what a word or phrase stands for, and how to link concepts together in meaningful ways. One method in which this is accomplished is dictionary-based annotation. Dictionaries are prepared with lists of words, including common parts of speech, such as nouns, verbs, conjunctions, etc. The dictionaries are then used to annotate each word in a phrase to be processed. Subsequently, post-processing must be done to eliminate redundant annotations by utilizing grammatical rules. Because of the large number of possible grammatical rules in a language, hundreds or thousands of rules may need to be applied to each word.

BRIEF SUMMARY

In one aspect of this disclosure, a computer implemented system and method is disclosed for natural language processing ambiguity resolution. The system and method comprise storing, in computer memory, an ontology specifying a set of grammatical rules. Using the computer processor, a phrase comprising at least one current word to be processed is retrieved. A current word from the phrase is annotated with possible ontological classes to which the current word belongs according to the ontology. Using the processor, any ontological rules associated with the possible ontological classes to which the current word belongs are retrieved. Possible ontological classes are eliminated based on the ontological rules. A surviving possible ontological class is determined to be an accurate ontological class for the current word.

In another aspect of this disclosure, a computer-implemented system and method is disclosed for generating a dictionary from a selected ontological classification for use in natural language processing. A request to generate a dictionary from a selected ontological classification is received using a computer processor. All word instances belonging to the selected ontological classification are retrieved using the computer processor and compiled into a list.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 2A illustrates the effects of natural language processing ambiguity resolution on an example ambiguous word;

FIG. 2B continues to illustrate the effects of natural language processing ambiguity resolution on the example ambiguous word of FIG. 2A;

FIG. 2C continues to illustrate the effects of natural language processing ambiguity resolution on the example ambiguous word of FIG. 2A;

DETAILED DESCRIPTION

This application discloses a computer-implemented system and method for natural language processing ambiguity resolution and generating an ontology-based dictionary. The natural language processing ambiguity resolution system and method utilizes a language ontology instead of simplistic word dictionaries to understand language. Language ontologies are known in the art, but will be briefly discussed here for the sake of clarity (and with more detail in FIG. 3 below). The ontology creates a hierarchy representing the structure of the language. Broad concepts in the language may be represented as Ontological Classes, which may be subdivided further into Ontological Sub-Classes. For example, a major Ontological Class like "words" may be divided into Sub-Classes like "nouns," "verbs," "adjectives," etc., which may be further divided into further Sub-Classes, such as "pronouns," "single-word verbs," "multi-word verbs," etc. The entire structure of the language may thus be represented by the ontology. Ontological Classes may be related by Ontological Relations. For example, an Ontological Sub-Class of "nouns" called "pronouns" may be related to the former as inclusive within the "nouns" class. Similarly, features or characteristics of the Ontological Classes may be stored in the ontological model as Ontological Attributes. Ontological Rules may be associated with Ontological Classes, Relations and Instances (i.e., specific words) in accordance with actual grammatical rules used by the represented language.

The use of an ontology conveys a benefit to natural language processing ambiguity resolution. Because the structure of the language is represented by the ontology, it is unnecessary for the system to apply every possible grammatical rule to the ambiguous word. Instead, only the rules associated with the possible Ontological Classes, Relations, etc. need be retrieved and applied to the word to resolve its grammatical ambiguity, greatly reducing the processing time necessary to resolve word ambiguity. The language ontology may also be used to generate conventional dictionaries by, for example, retrieving every word instance directly associated with a selected Ontological Class, and compiling it into a list.

Figure 1:
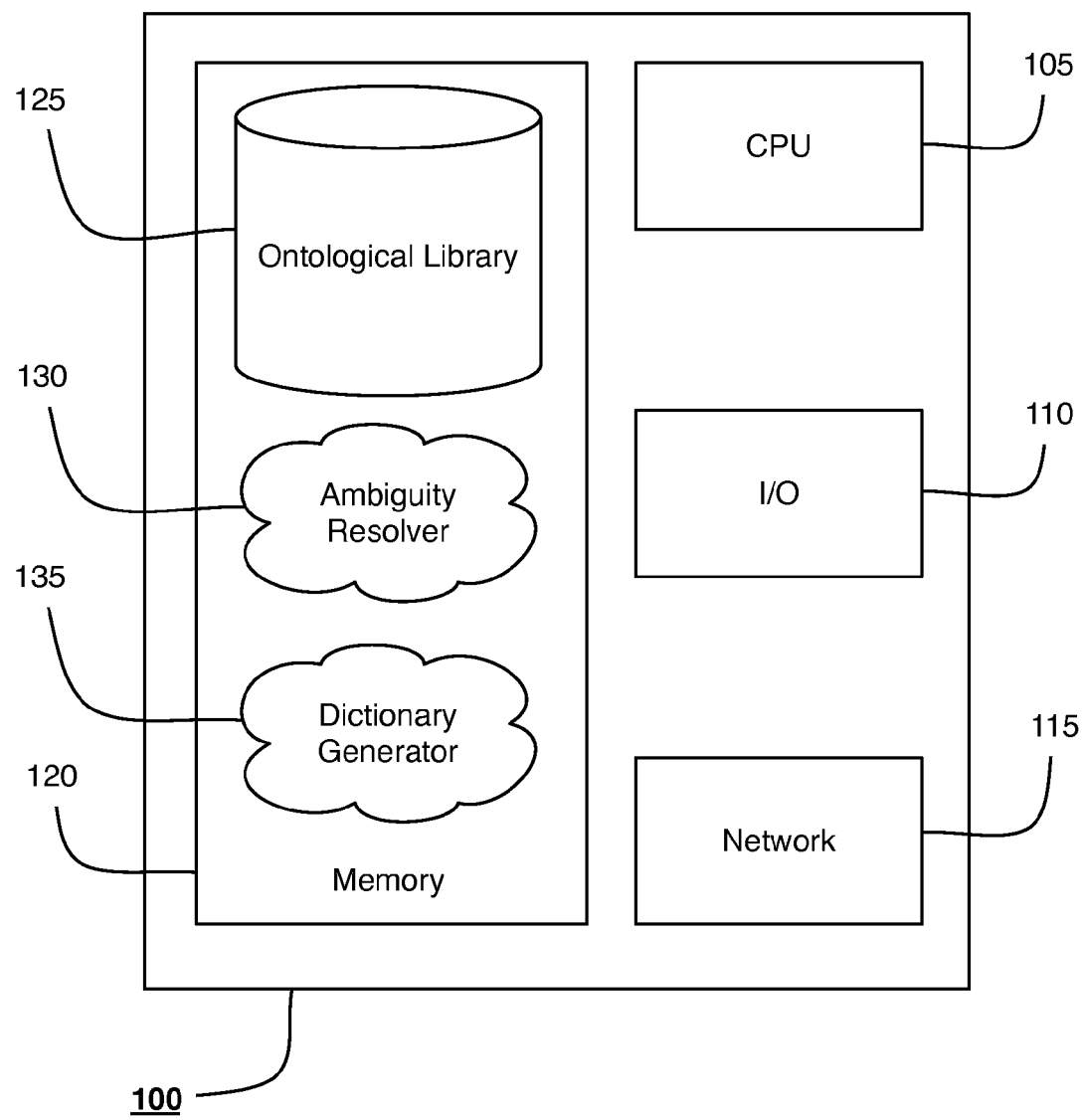
FIG. 1 is a high level representation of an illustrative natural language processing ambiguity resolution and an ontology-based dictionary generator system.

FIG. 1 is a high level representation of an illustrative natural language processing ambiguity resolution and an ontology-based dictionary generator system 100. The natural language processing ambiguity resolution and an ontology-based dictionary generator system 100 preferably includes a central processing unit ("CPU") 105, memory 120, network device 115 and input/output device 110. The CPU 105 receives and executes program instructions. Memory 120 may be provided for both long term and short-term memory (i.e., random access memory and hard disk storage), and provide data storage for the CPU 105. Network device 115 may provide connectivity to a network, which may be, for example, an intranet, extranet or the Internet. Input/output device 110 may provide accessibility for human operators, including devices such as keyboards, mice, displays, touch screens, etc.

Software processes ambiguity resolver 130 and the dictionary generator 135 may be stored in memory 120 and are executable by the CPU 105 to operate on the natural language processing ambiguity resolution and ontology-based dictionary generator system 100, facilitating or executing the actual processes of resolving word ambiguity and generating word dictionaries from ontological libraries. The ambiguity resolver 130 and the dictionary generator 135 may be separate software processes, or they may be implemented within the same software process. The ontological library 125 may be stored as a data structure in memory 120 (or in other storage accessible by the system 100), and include an ontological universe for one or more desired languages.

FIGS. 2A, 2B and 2C are high-level overviews of the process by which natural language processing ambiguity resolution may be executed on an example ambiguous word 205 contained in a to-be-resolved phrase 200. In FIG. 2A, a phrase to be processed 200 is received by the CPU 105. Then, one of the words in the received phrase is selected for processing by the ambiguity resolver 130. In this example, the word "these" 205 is selected. In FIG. 2B, the selected word "these" 205 is then annotated with possible Ontological Classes and Sub-Classes of which "these" 205 is directly ontologically related (based on the ontological library 125). In this example, a "pronoun" annotation 210 and "adjective" annotation 215 are used to annotate or otherwise mark the selected word "these" 205. In the example shown in FIG. 2C, the "adjective" annotation 215 is eliminated based on an Ontological Rule, associated with the "adjective" sub-class, that, for example, adjectives must be followed by nouns. When the ambiguity resolver 130 applies this rule to the phrase 200, it determines that there is no "noun" word following the selected word "these" 205. Therefore, based on the Ontological Rule, the ambiguity resolver 130 may determine that the selected word "these" 205 cannot be an adjective, eliminating it as depicted. With only one annotation remaining in this example, the ambiguity resolver 130 has determined that the selected word "these" 205 is a pronoun. Similarly, if there had been an adjacent word following the word "these" 205 in the phrase 200, a determination of the classification of the adjacent word would be necessary to make a determination of whether the selected word "these" 205 is an adjective. If such a determination were made, then, based on the Ontological Rule, and the fact that the adjacent word is not a noun, a determination could be made by the ambiguity resolver 130 that the selected word "these" 205 is not an adjective, and therefore must be a pronoun.

Figure 3:
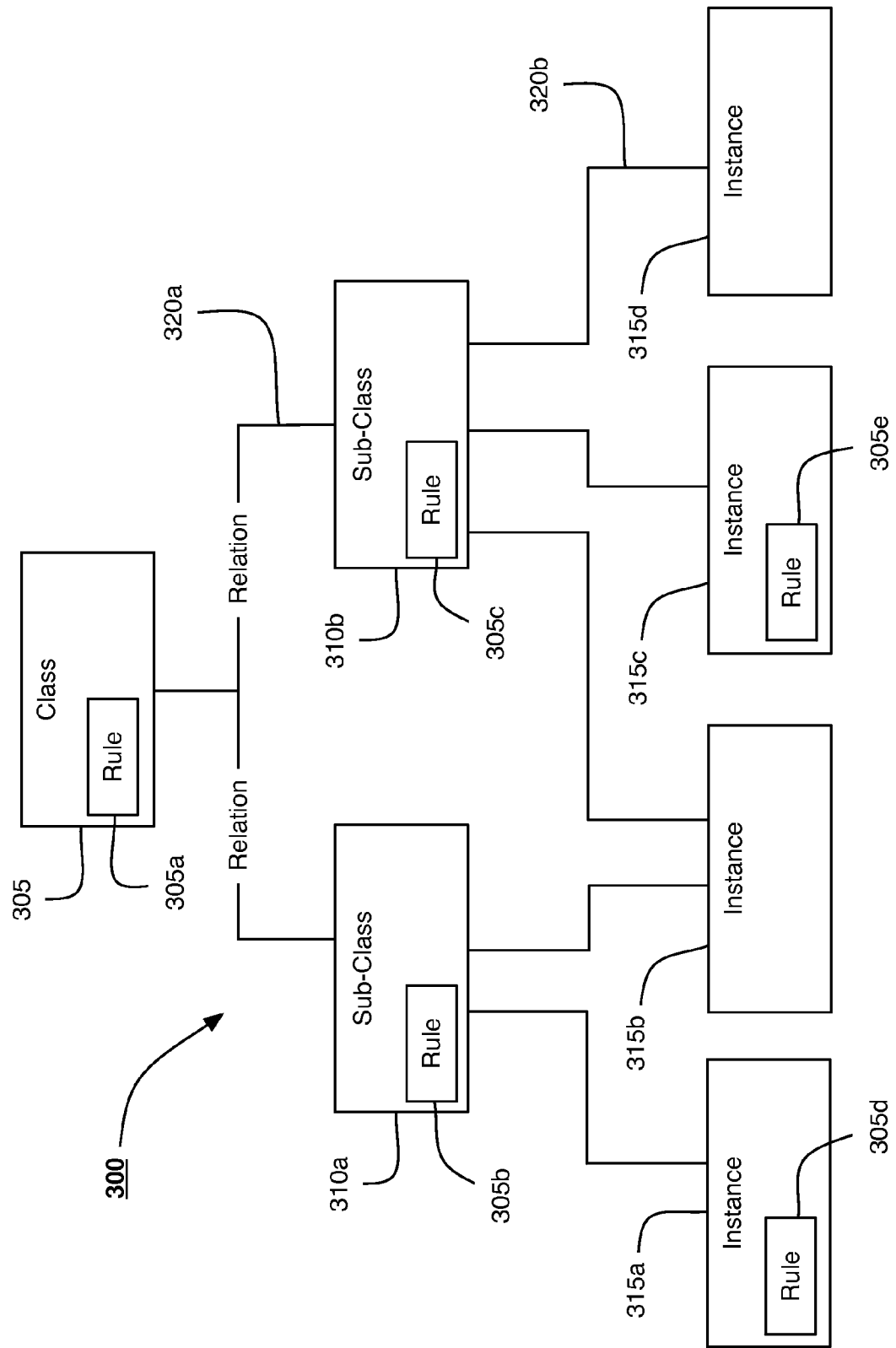
FIG. 3 illustrates a representative ontological library.

FIG. 3 illustrates a representative (simplified) ontological library 300. An actual ontological library 300 corresponding to a real language will necessarily be more complex and involved. The ontological library contains a class 305 (which may correspond to large categories of words, such as nouns, verbs, etc.), sub-classes 310a and 310b (which may correspond to more specific categories of words, such as pronouns, proper nouns, etc.) and instances 315a, 315b, 315c and 315d (which may correspond to specific instances of words belonging to the related respective class or sub-class. These classes are related via Ontological Relationships such as relationships 320a and 320b, designating, for example, that sub-class 310b belongs to class 305, and instance 315d belongs to sub-class 310b (and in turn, class 305). Certain classes, sub-classes or instances may have one or more Ontological Rules 305a, 305b, 305c, 305d and 305e associated with them. These may correspond to broad rules of grammar, usage-specific exceptions, norms of use, or any other rule of language that may be required to accurately represent the desired ontologically.

Figure 4:
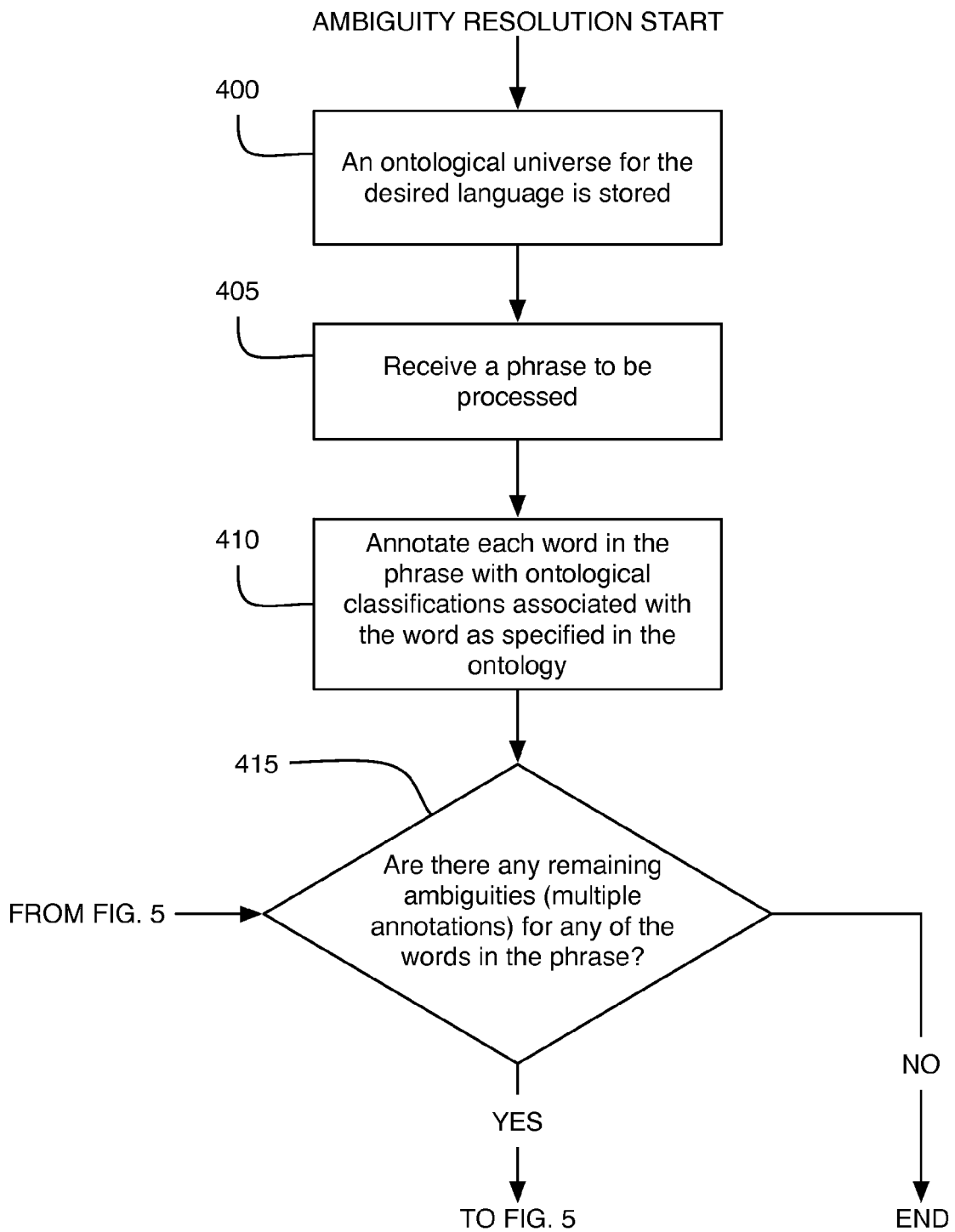
FIG. 4 illustrates a preferred sequence of steps for natural language processing ambiguity resolution.
Figure 5:
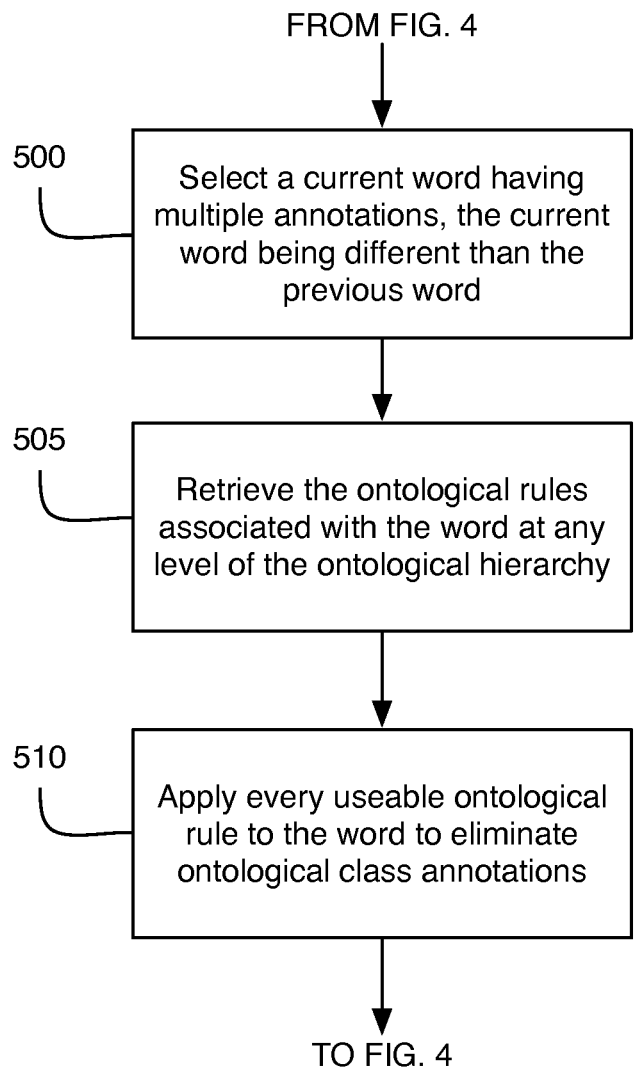
FIG. 5 illustrates a continuing sequence of steps from FIG. 4 for processing ambiguity resolution.

FIGS. 4 and 5 illustrate a preferred sequence of steps for natural language processing ambiguity resolution. An ontological library or universe 125 for one or more desired languages is received and stored, preferably in memory 120 of the natural language processing ambiguity resolution system 100 (step 400). A phrase to be processed is received by CPU 105 of the natural language processing ambiguity resolution system 100 (step 405). Each word in the phrase is annotated using the ambiguity resolver 130 with one or more ontological classifications to which the word belongs, as specified in the ontological library or universe 125 (step 410). The ambiguity resolver 130 may then determine whether there are any remaining ambiguities for any of the words in the phrase (step 415), an ambiguity being the presence of more than one ontological class annotation on a single word.

Referring to FIG. 5, a word having an ambiguity is selected for processing by the ambiguity resolver 130 (step 500). The current word may be different than a previously selected word to ensure the system 100 continuously moves on to processing a new word with new information. As ambiguity is resolved, some ontological rules that did not previously apply may then be applied. Ontological rules associated with the ontological annotations for the word are then retrieved from the ontological library 125 (step 505). Rules are preferably retrieved from any level of the ontological hierarchy. For example, rules associated with the word itself, with the sub-class of which the word belongs, and rules associated with a greater class inclusive of the sub-class may all be retrieved for use in resolving ambiguity. Every useable ontological rule is utilized to eliminate ontological class annotations from the current word (step 510). The system 100 may then return to FIG. 4 for continued processing. If no ambiguities remain (step 415), then the process may end.

Some rules may not yet be useable because of ambiguity of surrounding words. For example, if an ontological rule states that an adjective must precede a noun, but the next word in the sentence has not yet been determined to be a noun, the ambiguity may be unresolveable until the system 100 processes the adjacent word. These ambiguities will be resolved in subsequent loops of the system 100, since the process continues as long as there are unresolved ambiguities, and the process always selects a new word different than the previous word for processing. Naturally, the system may in some cases encounter unresolveable ambiguities. A count may be imposed on to trigger termination of the loop, and a generated notification of the problem may be sent to an administrator if the system 100 detects that it is trapped in an infinite loop with an unresolveable ambiguity.

Figure 6:
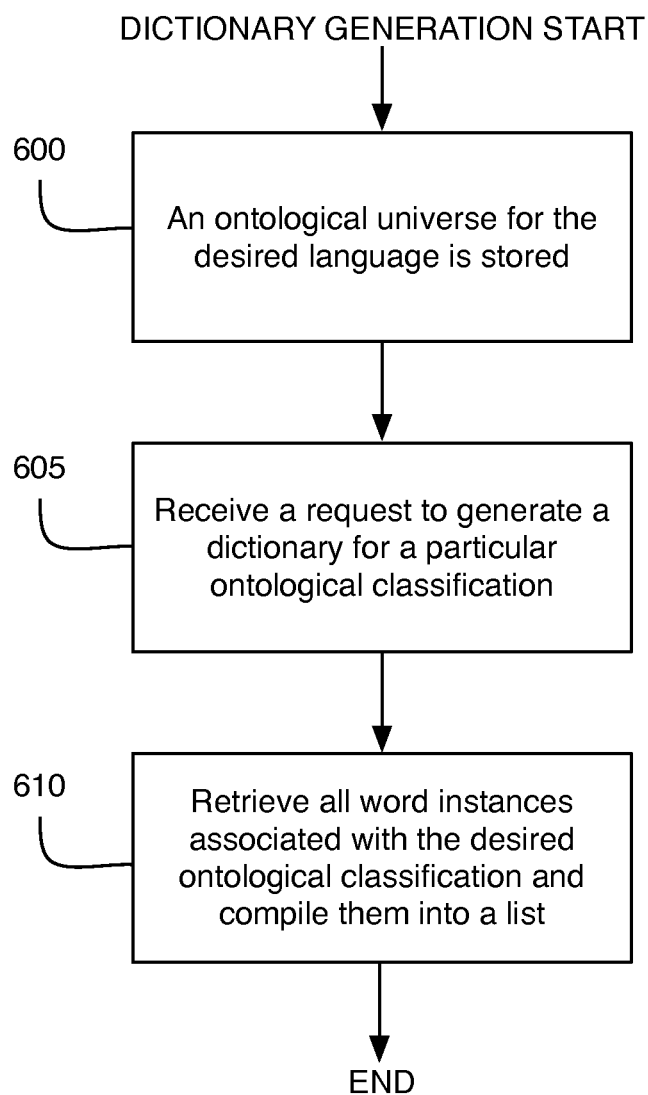
FIG. 6 illustrates a preferred sequence of steps for ontology-based dictionary generation.

FIG. 6 illustrates an illustrative sequence of steps for ontology-based dictionary generation. An ontological library or universe 125 may be stored in memory 120 of system 100 (step 600). The system 100 may then receive a request to generate a dictionary for an ontological classification (step 605). All word instances associated with the ontological classification may then be retrieved and compiled into a list by the dictionary generator 135 (step 610).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A computer implemented method for natural language processing ambiguity resolution, comprising:
   storing, in computer memory, an ontology specifying a set of grammatical rules, wherein the rules are associated with a word, with a sub-class of which the word belongs, and rules are associated with a greater class inclusive of the sub-class;
   receiving, using a computer processor, a phrase having a natural language processing ambiguity and comprising at least one current word to be processed;
   annotating, using the computer processor, each word from the phrase with an ontological class and sub-class to which the current word belongs according to the ontology, the subclass being associated with the class, the class further including at least one other sub-class, the class and sub-classes each having an associated one of the grammatical rules;
   retrieving, using the processor, the grammatical rules associated with the ontological classes and sub-classes to which the current word belongs;
   eliminating, using the processor, one or more ontological classes or sub-classes based on the grammatical rules associated with the respective classes and sub-classes;
   determining, using the processor, a surviving ontological class and sub-class to be an accurate ontological class and sub-class for each word to resolve the natural language processing ambiguity;
   storing, using the processor, the surviving ontological class and sub-class into an ontological library;
   receiving, using the computer processor, a request to generate a dictionary for a selected ontological classification or sub-classification;
   retrieving, using the computer processor, all word instances belonging to the selected ontological classification or sub-classification; and
   compiling the retrieved word instances into a list to generate the requested dictionary for the selected ontological classification or sub-classification.

2. The method of claim 1, further comprising:
   retrieving, using the processor, an ontological class or sub-class of an adjacent word from the phrase, the adjacent word being adjacent to the current word;
   comparing, using the processor, the ontological class or sub-class of the adjacent word with a required ontological class or sub-class according to the ontological rule of one of the ontological classes or sub-classes to which the current word belongs; and
   eliminating the one of the ontological classes or sub-classes to which the current word belongs if the ontological class or sub-class of the adjacent word does not match the required ontological class or sub-class.

3. The method of claim 2, further comprising:
   repeating all steps for each word in the phrase until each word of the phrase is each annotated with only a single respective ontological class and sub-class from the ontology.

4. A system for natural language processing ambiguity resolution, comprising:
   a computer processor; and
   computer memory, the computer memory storing an ontology specifying a set of grammatical rules, wherein the rules are associated with a word, with a sub-class of which the word belongs, and rules are associated with a greater class inclusive of the sub-class, and a series of program instructions, wherein the program instructions are executable by the computer processor to:
   receive, using the computer processor, a phrase having a natural language processing ambiguity and comprising at least one current word to be processed,
   annotate, using the computer processor, each word from the phrase with an ontological class and sub-class to which the current word belongs according to the ontology, the sub-class being associated with the class, the class further including at least one other sub-class, the class and sub-classes each having an associated one of the grammatical rules,
   retrieve, using the processor, the grammatical rules associated with the ontological classes and sub-classes to which the current word belongs,
   eliminate, using the processor, one or more possible ontological classes or sub-classes based on the grammatical rules associated with the respective classes and sub-classes,
   determine, using the processor, a surviving possible ontological class and sub-class to be an accurate ontological class and sub-class for each word to resolve the natural language processing ambiguity;
   store, using the processor, the surviving ontological class and sub-class into an ontological library;
   receive, using the computer processor, a request to generate a dictionary for a selected ontological classification or sub-classification;
   retrieve, using the computer processor, all word instances belonging to the selected ontological classification or sub-classification; and
   compile the retrieved word instances into a list to generate the requested dictionary for the selected ontological classification or sub-classification.

5. The system of claim 4, wherein the program instructions are further executable by the computer processor to:

retrieve, using the processor, an ontological class or sub-class of an adjacent word from the phrase, the adjacent word being adjacent to the current word;

compare, using the processor, the ontological class or sub-class of the adjacent word with a required ontological class or sub-class according to the ontological rule of one of the ontological classes or sub-classes to which the current word belongs; and eliminate the one of the ontological classes or sub-classes to which the current word belongs if the ontological class or sub-class of the adjacent word does not match the required ontological class or sub-class.

6. The system of claim 5, wherein the program instructions are further executable by the computer processor to:

repeat all steps for each word in the phrase until each word of the phrase is each annotated with only a single respective ontological class and sub-class from the ontology.

* * * * *